US010747290B1

(12) United States Patent
Molnar et al.

(10) Patent No.: US 10,747,290 B1
(45) Date of Patent: Aug. 18, 2020

(54) VARYING APPLICATION STRATEGY BASED ON DEVICE STATE

(71) Applicant: shopkick, Inc., Redwood City, CA (US)

(72) Inventors: Joseph Reginald Scott Molnar, Menlo Park, CA (US); Todd Sean Murchison, Santa Clara, CA (US)

(73) Assignee: shopkick, Inc., Redwood City, CA (US)

( * ) Notice: Subject to any disclaimer, the term of this patent is extended or adjusted under 35 U.S.C. 154(b) by 175 days.

(21) Appl. No.: 15/942,062

(22) Filed: Mar. 30, 2018

(51) Int. Cl.

| | |
|---|---|
| ***G06F 1/00*** | (2006.01) |
| ***G06F 1/26*** | (2006.01) |
| ***G06F 1/3206*** | (2019.01) |
| ***H04L 29/08*** | (2006.01) |
| ***H04W 4/02*** | (2018.01) |

(52) U.S. Cl.
CPC ............ *G06F 1/3206* (2013.01); *H04L 67/24* (2013.01); *H04W 4/02* (2013.01)

(58) Field of Classification Search
None
See application file for complete search history.

(56) References Cited

U.S. PATENT DOCUMENTS

2012/0036378 A1* 2/2012 Lee ........................ G06F 1/263 713/320
2012/0260166 A1* 10/2012 Cipollo .............. G06F 3/04847 715/716
2014/0004880 A1* 1/2014 Shen ...................... G01S 19/23 455/456.1
2014/0032691 A1* 1/2014 Barton ................... H04L 41/00 709/206
2016/0094984 A1* 3/2016 Singer .................... H04W 8/22 455/418
2016/0232116 A1* 8/2016 Bone .................... G06F 9/4401
2017/0040817 A1* 2/2017 Hu ......................... H02J 7/045
2017/0064073 A1* 3/2017 Spencer ........... H04M 1/72577

* cited by examiner

*Primary Examiner* — Nitin C Patel
(74) *Attorney, Agent, or Firm* — Finnegan, Henderson, Farabow, Garrett & Dunner LLP

(57) ABSTRACT

Techniques for varying application strategy for different device states are disclosed. In some embodiments, an application strategy for an application running on a mobile device is selected based on a state of the mobile device and executed with respect to the application while the mobile device remains in that state. A different application strategy is selected and executed with respect to the application when the mobile device enters a different state. That is, different application strategies are selected and executed with respect to the application for different detected states of the mobile device.

20 Claims, 4 Drawing Sheets

400 select application strategy based on current device state — 402 execute currently selected application strategy — 404 state change? — 406 no yes vary application strategy accordingly — 408

VARYING APPLICATION STRATEGY BASED ON DEVICE STATE

BACKGROUND OF THE INVENTION

Existing power/battery management techniques typically operate at a system level. That is, such techniques simply enable or disable applications running on a system based on current power/battery levels. Thus, there exists a need for improved power/battery management techniques at an application level, i.e., within an application.

BRIEF DESCRIPTION OF THE DRAWINGS

Various embodiments of the invention are disclosed in the following detailed description and the accompanying drawings.

DETAILED DESCRIPTION

Figure 1:
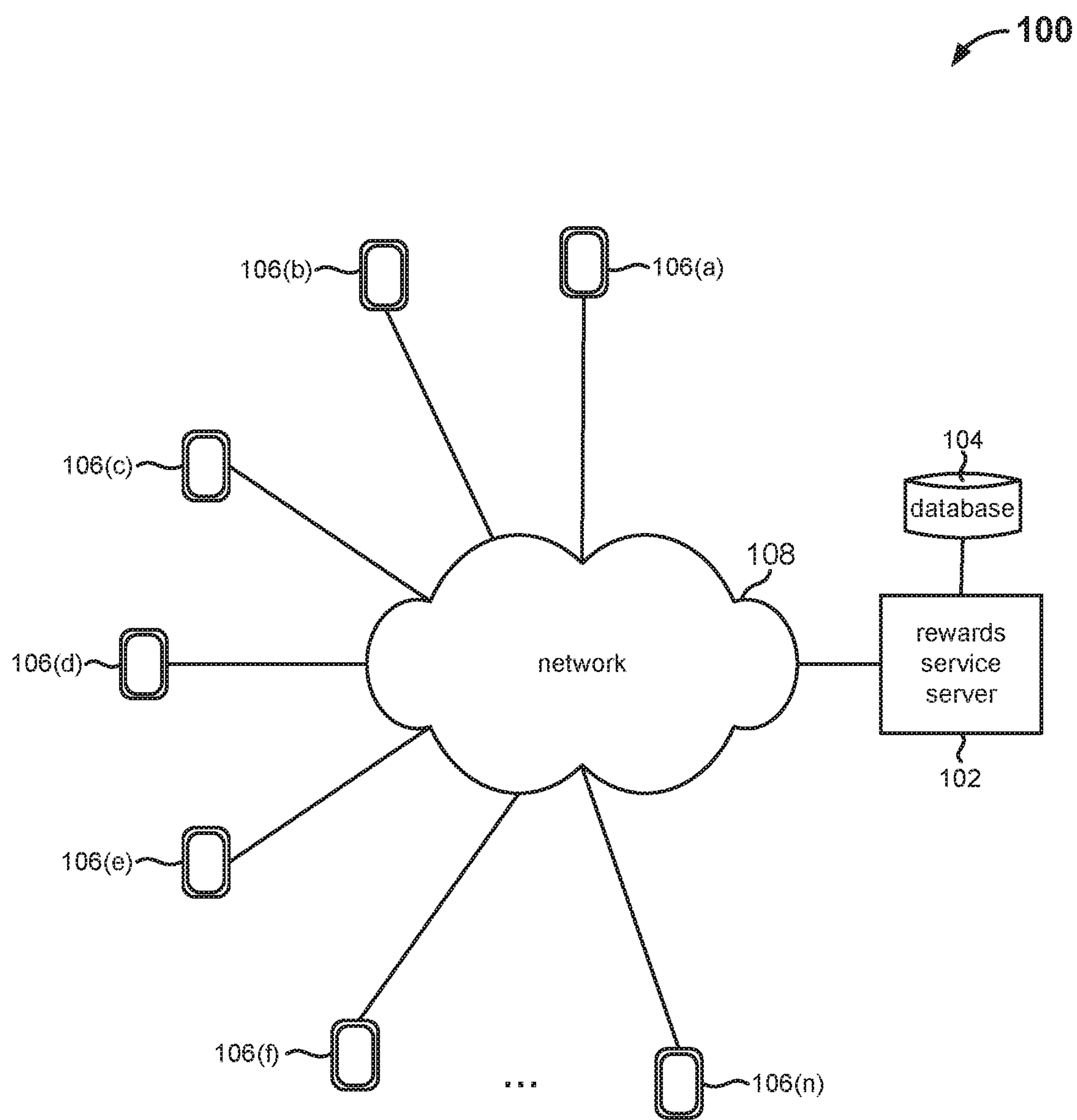
FIG. 1 is a high level block diagram illustrating an embodiment of a network environment in which a rewards service is provided.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A variety of applications and application features exist that are based at least in part on reliable presence or location detection. Knowledge of a current absolute or relative position of a user or device, for example, at or within a geographical area or venue such as a store, may be employed with respect to various contexts, such as facilitating provisioning of content relevant to the area or venue at which presence is detected or issuing an offer or reward in exchange for presence.

An example application that at least in part is based on determining or detecting user presence or location comprises a rewards service application that facilitates provisioning of offers or rewards on behalf of various entities to users in response to various user actions. For instance, rewards such as an award of redeemable points, an offer of an otherwise unavailable discount or promotion, a gift card or certificate, a monetary value, etc., may be provided in response to user actions such as a check-in, walk-in, store or department visit, product or other barcode scan, purchase, etc. In some embodiments, such rewards for prescribed user actions are dynamically and automatically provided to users in real-time, for example, as or when the user engages in or completes one or more requisite actions for earning the rewards. In some such cases, knowledge of exact or estimated absolute or relative user position may determine whether a user qualifies for a location-based reward.

FIG. 1 is a high level block diagram illustrating an embodiment of a network environment 100 in which a rewards service is provided. The rewards service comprises client and server components. In one embodiment, the rewards service comprises a mobile application that communicates with a server application. In another embodiment, the rewards service comprises a web application which may communicate with mobile devices via SMS (Short Message Service) or push notifications.

In the given example, the rewards service is developed, distributed, and/or managed by the entity comprising server 102. Although depicted as a single block in FIG. 1, rewards service server 102 may comprise any number of possibly networked components. For example, server 102 may be a part of a server farm. Information associated with available rewards and corresponding rules for earning available rewards, partners (e.g., entities providing the rewards, entities from which data needed for determining rewards is obtained, etc.), as well as the users of the rewards service is stored in one or more databases such as database 104. In some embodiments, a unique user account is associated with each user of the rewards service.

The rewards service is available to users of each of a plurality of devices 106. In some embodiments, a client-side application is installed on a device 106. For instance, a client-side rewards service application may be downloaded from server 102 or another application repository and installed on a device 106. Alternatively, a device 106 may access a rewards service application published by server 102 via a web interface. In FIG. 1, devices 106 are depicted as cellular or mobile phones. However, generally, a device 106 may comprise any other computing device that is capable of communicating with server 102, such as a personal or enterprise digital assistant, tablet computer, laptop computer, etc.

A typical device 106 comprises a microprocessor, a memory coupled to the microprocessor providing both code that the microprocessor executes and data under the control of the microprocessor, a display (e.g., a touch-sensitive display) through which a user may view and interact with user interface elements, a microphone, a cellular transceiver, a WIFI transceiver, a BLUETOOTH and/or BLE (BLUETOOTH Low Energy) transceiver, GPS (Global Positioning System) sensors, an accelerometer, a gyroscope, a magnetometer, and various other components. When a device 106 performs a task, the microprocessor of the device 106 performs applicable operations according to relevant code/data stored in its associated memory and interactions with other components within the device 106, as necessary, to perform the task.

As depicted, communication between server 102 and devices 106 is facilitated via network 108. In various embodiments, network 108 may comprise any combination of one or more public, private, wired, and/or wireless networks, such as a cellular/mobile network or the Internet. Example communications between server 102 and devices 106 may include, for instance, the download of a client-side application from server 102 at a device 106; the communication of user information, preferences, and/or selections from a device 106 to server 102, some of which may be stored in database 104, for example, with respect to an associated user account; the communication of available offers or rewards by server 102 to a device 106 for display at and consideration by a user of the device; the communication of occurrences of user actions that facilitate qualifying for various offers or rewards from a device 106 to server 102; notifications by server 102 of earned rewards or remaining user actions that need to be completed to earn available rewards to a user of a device 106; redemption of an available offer or earned reward by a user of a device 106 via server 102; etc.

The rewards service described with respect to FIG. 1 is merely one example of an application that may at least in part be based on current user location or presence at or within a venue such as a store. The disclosed presence/location detection techniques may generally be employed with respect to any other application that uses presence/location information at one or more levels of granularity, such as within a geographical region, at a venue, at a specific place within a venue (e.g., at a department or near a display at a store), etc.

Figure 2:
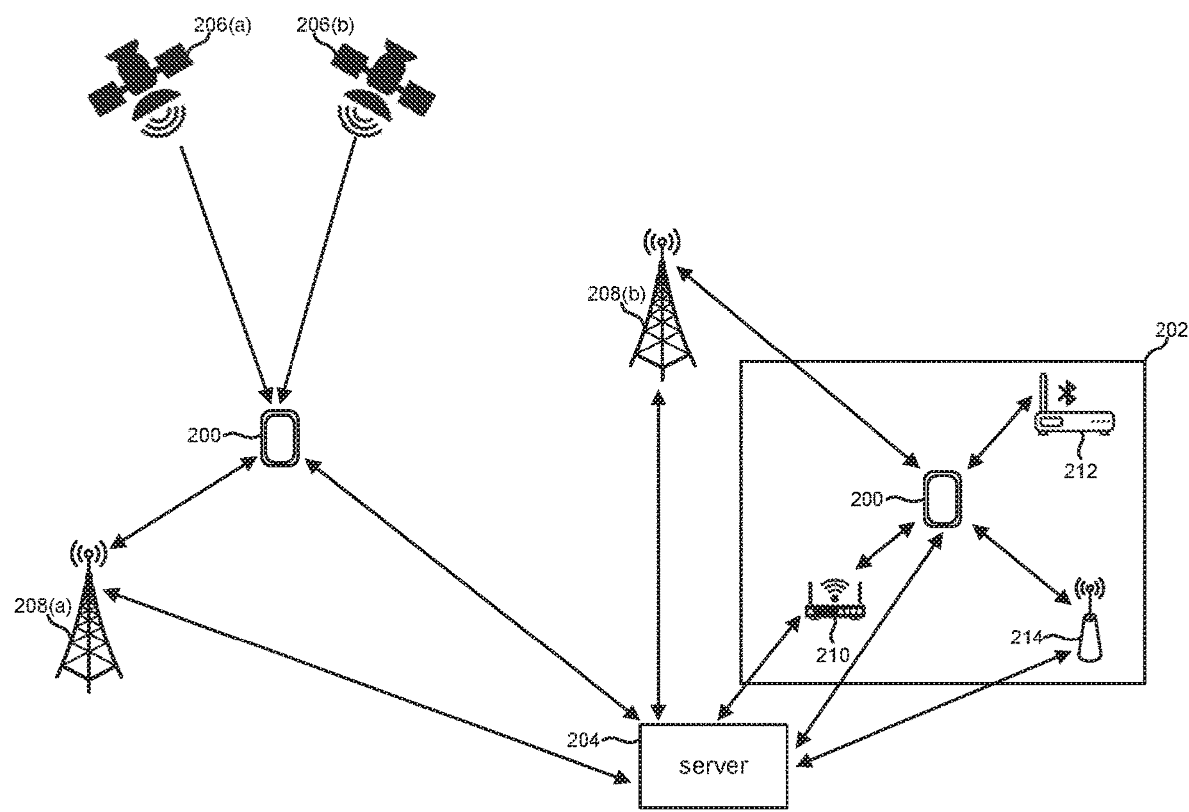
FIG. 2 is a high level block diagram illustrating example technologies that may be employed to determine, estimate, or track current device/user location or position.

FIG. 2 is a high level block diagram illustrating example technologies that may be employed to determine, estimate, or track current device/user location or position. For instance, such technologies may be employed by applications that rely on presence detection, such as the rewards service described with respect to FIG. 1. One or more of the systems illustrated in FIG. 2 may be used with a device 200 (e.g., which may comprise any of devices 106 of FIG. 1) when it is outdoors or indoors within a building 202. Moreover, one or more systems may independently be in communication with an associated server 204 (e.g., which may comprise server 102 of FIG. 1).

As depicted in FIG. 2, example technologies include GPS (Global Positioning System) 206, cellular network 208, WIFI (wireless local area network) 210, BLUETOOTH and/or BLE (BLUETOOTH Low Energy) 212, and sound transmitter 214 configured to transmit a (e.g., ultrasonic) sound signal. GPS 206 may be employed to identify device 200 locations in outdoor areas or environments while cellular network 208 may be employed for triangulation or trilateration of device 200 in both outdoor and indoor contexts. Entry or presence of device 200 inside building 202 may be detected via a venue identifier determined from or encoded within WIFI 210 communications (e.g., from an identifier such as an SSID (Service Set IDentifier) broadcast by WIFI network 210), BLUETOOTH or BLE 212 communications (e.g., an associated service identifier or service parameter), and/or the sound signal transmitted by sound transmitter 214. Such a venue identifier may be communicated to and/or decoded by server 204 to determine or infer presence at a corresponding venue or part thereof. In some cases, a plurality of access points, beacons, and/or transmitters may be deployed throughout building 202, for example, so that more specific locations or positions of device 200 within building 202 (e.g., floors, departments, aisles, etc., within a store) may be determined.

In addition to and/or instead of one or more of the example systems illustrated in FIG. 2, other available technologies may be employed to determine device presence or location. For instance, a venue identifier may be communicated to device 200 via short range RF (radio frequency) such as RFID (radio-frequency identification) and/or barcodes. Presence of device 200 within an area covered by WIFI network 210 may be determined based on device identifier recognition such as device 200 MAC (Media Access Control) address detection at WIFI device 210, e.g., when device 200 sends a probe request. Furthermore, magnetic field variations detected by a magnetometer of device 200 and/or detection of at least a portion of a magnetic field fingerprint or blueprint of a prescribed building may be employed to determine presence within the prescribed building or a part thereof. Moreover, other sensors such as an accelerometer and/or a gyroscope may be employed to detect motion and/or tilting of device 200. Generally, any one or more available technologies may be employed in determining presence/location of device 200.

Each potential technology or system that may be employed for presence detection or location identification comprises a signal source and requires corresponding software and hardware components (e.g., applicable signal transceivers or sensors) to be available and activated on device 200. A signal source may comprise an external signal source or an internal signal source (e.g., a sensor) of device 200. That is, in some cases, device 200 or a component thereof comprises a signal source itself. A device 200 that detects or receives a signal from a prescribed signal source observes data such as signal values, signal strength, SNR (signal-to-noise ratio), and/or other signal characteristics, attributes, or properties. A signal from a prescribed signal source may be employed independently or in concert or combination, either serially or in parallel, with signals from one or more other signal sources to determine, estimate, or infer device presence or location. Different signal sources may facilitate determining location or position information having different degrees or levels of granularity. Each technology employed as well as associated communications consume device power. Thus, sensors and/or receivers for various signals may not all be always available at device 200 and may sometimes be automatically or manually de-activated, e.g., during low power states of device 200.

Operation of a prescribed technology at device 200 (e.g., sensor operation) or generally signal processing at device 200 (e.g., for applications or tasks such as presence or location detection) are often conducted when the device has power constraints, e.g., when the device is operating on battery power. In such cases, efficient power consumption and battery conservation are key considerations since each technology or processing action is associated with a power/battery cost. Moreover, it is advantageous to not draw as much power when not needed to lower operation costs. That is, even in cases in which power constraints do not exist at device 200, it is desirable to more intelligently select and employ available technologies and resources at the device to reduce or minimize processing overhead.

Different technologies and processing actions are associated with different power costs. Moreover, the same technology or processing step may result in different power costs at different devices. In many cases, the power cost of a prescribed technology or processing action at a device depends on the specific hardware and/or software components comprising the device and may vary for different units of the same type of device as well as different types (e.g., manufacturers, makes, models, versions) of devices.

Figure 3:
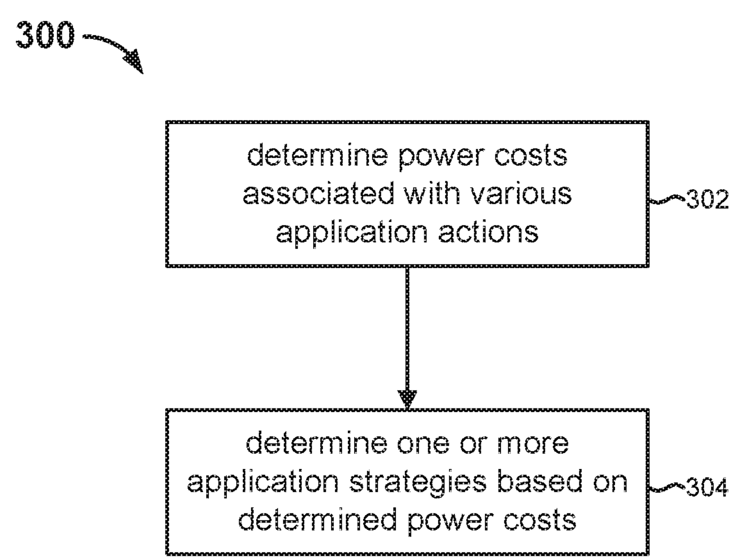
FIG. 3 is a high level flow chart illustrating an embodiment of a process for determining application strategies based on power costs associated with executing application actions comprising the strategies.

FIG. 3 is a high level flow chart illustrating an embodiment of a process for determining application strategies based on power costs associated with executing application actions comprising the strategies. For example, process 300 of FIG. 3 may be employed to identify or determine different application strategies for a prescribed device or type of device for different (e.g., power) states of the device. An application strategy comprises one or more potentially optional application actions and, in some cases, specifies frequencies for performing such actions and/or a hierarchy or order for performing the actions, e.g., if some or all are not executed simultaneously or in parallel. Process 300 may generally be employed with respect to any application or feature thereof and may be iterated for different types of devices, for example, to determine application strategies for each type for various device states. In some embodiments, process 300 comprises an offline process to determine potential application strategies for a prescribed device or type of device. In such cases, determined potential application strategies may be used as a reference/look-up to help make decisions during application run-time based on current device state, and a currently executing application strategy may be automatically and/or dynamically updated or adapted in real time as the device state changes or varies.

In the context of the given example, for instance, process 300 may be employed to identify one or more application strategies that comprise employing one or more presence or location detection technologies (and corresponding update frequencies and/or hierarchy thereof), for example, for different states of a device or type of device, such as device 106 of FIG. 1 or device 200 of FIG. 2. Process 300 may be iterated for different types of devices since different devices experience different power costs for different technologies or application actions. In various embodiments, process 300 may be performed by a server such as server 102 of FIG. 1 or server 204 of FIG. 2 and/or locally at a device such as device 106 of FIG. 1 or device 200 of FIG. 2.

Process 300 starts at step 302 at which the power costs of performing or executing various application actions with respect to a device or type of device are determined. Such power costs may be empirically determined and may be based on data obtained from associated application and/or battery/power managers. In some cases, the determined power costs are at least in part based on crowd sourced data from a large number of devices. With respect to the given example, for instance, step 302 comprises determining power costs of different presence or location detection technologies (such as those described with respect to FIG. 2) at a prescribed device or type of device.

At step 304, one or more application strategies are determined based on the power costs determined at step 302. The power cost of an application strategy depends on the power costs of the application actions comprising the application strategy, e.g., is the sum of the power costs of the associated application actions. In some cases, different application strategies are identified at step 304 for different power states of a device or device type under consideration. For example, a (lower power cost) application strategy with fewer actions and/or lower corresponding frequencies may be determined for a lower power state of a device relative to a higher power state of the device. With respect to the given example, for instance, a strategy comprising fewer presence or location detection technologies and/or technologies having relatively lower power costs for a given device as well as lower update frequencies may be determined at step 304 for a low power state of the given device while a strategy comprising more presence or location detection technologies and/or technologies having relatively higher power costs for the given device as well as higher resolutions and/or update frequencies may be determined at step 304 for a high power state of the given device. Generally, any number of application strategies may be identified at step 304 across a power state gradient of a given device.

Figure 4:
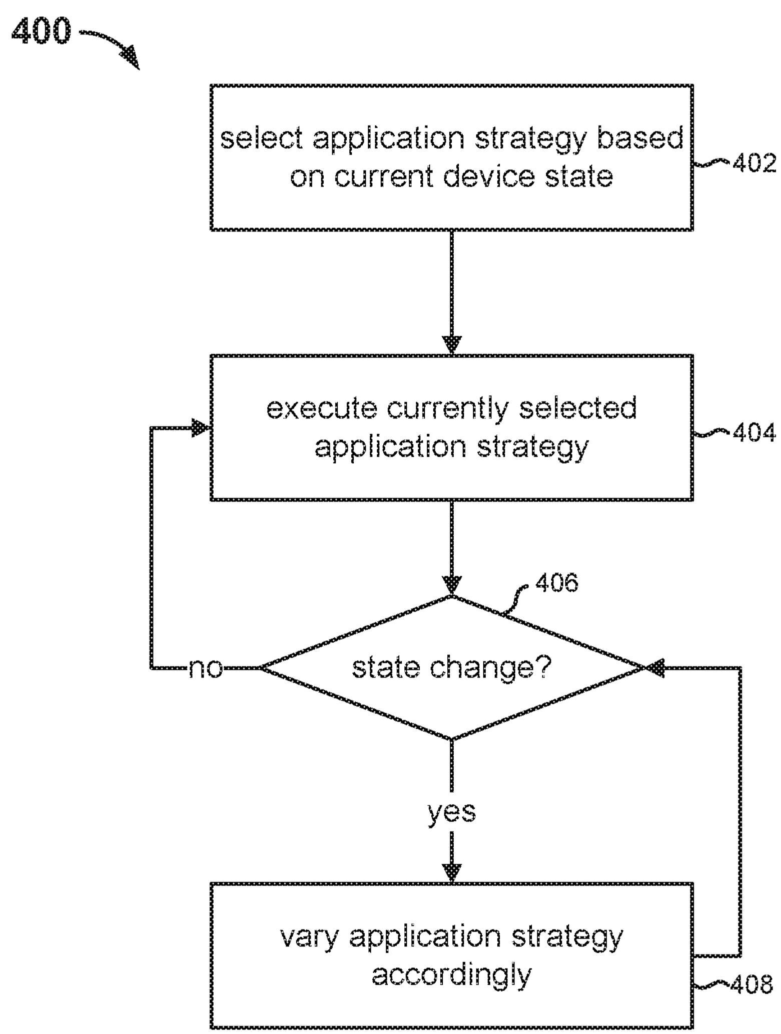
FIG. 4 is a high level flow chart illustrating an embodiment of a process for selecting and adapting application strategy based on device state.

FIG. 4 is a high level flow chart illustrating an embodiment of a process for selecting and adapting application strategy based on device state. Process 400 may be employed, for example, with respect to an application running on a device such as device 106 of FIG. 1 or device 200 of FIG. 2. In some embodiments, process 400 comprises dynamically and automatically varying application strategy as a state of a device under consideration changes. That is, application strategy (i.e., a selected set or subset of optional application actions to execute and/or frequency and/or order thereof) is intelligently adapted in real time based on device state. A device state may comprise a device power/battery state and/or one or more other device states, such as those depending on or resulting from one or more technologies (e.g., sensors) currently operating on the device, applications currently running on the device, current user interactions or activities with respect to the device or applications running on the device, etc., and/or data derived therefrom.

Process 400 starts at step 402 at which an application strategy is selected for an application running on a device based on a current device state. In some cases, step 402 occurs at a device when an application is initially launched, re-opened, or otherwise executed after a period of being unavailable or inactive. The application strategy selected at step 402 is executed for the application at step 404. That is, associated application actions as specified by the strategy are executed at step 404. At step 406, it is determined if the device state has changed. If it is determined at step 406 that the device state has not changed or has not changed in a manner that affects application strategy, the same application strategy is continued to be executed with respect to the application at step 404. If it is determined at step 406 that the device state has changed, e.g., in a manner that affects application strategy, the application strategy of the application is accordingly adjusted at step 408. For example, a different application strategy may be selected and executed with respect to the application at step 408. Alternatively, a currently executing strategy may be updated, adapted, or otherwise varied based on the change in device state. Process 400 subsequently continues at step 406 at which further changes in device state are monitored so that the currently employed application strategy can be adjusted as applicable.

With respect to the given example, for instance, one or more presence or location detection technologies may be selected and employed at a device based on the current device state and varied as the device state changes according to process 400. Moreover, the presence/location resolution and/or frequency of updates may be varied based on device state. For example, a strategy comprising fewer presence or location detection technologies and having lower frequencies of updates may be selected and executed for lower power states of a device. Other aspects that affect device state may also be taken into consideration to more appropriately and intelligently select a presence or location detection strategy. For example, if GPS data indicates that a device is currently located in or moving through a remote backcountry area, presence or location detection using technologies specific to indoor environments may be automatically disabled or deactivated so that device resources are not unnecessarily consumed. That is, indoor technologies may only be attempted to be employed when an indoor location of a device is detected or inferred, such as, for example, when a device is found to be at or close to a shopping complex or mall in an urban area. As another example, if the power cost of using WIFI at a prescribed device is high relative to other available technologies, WIFI may not be used for presence or location detection at the device, unless, for instance, a user of the device is already using WIFI for other purposes, in which case WIFI may also be used for presence or location detection. Moreover, if a user manually deactivates a particular technology (e.g., BLUETOOTH, WiFi, etc.), that technology may be removed from a strategy or a strategy that does not include that technology may be selected. As indicated by these examples, varying and adapting application strategy based on device state provides more efficient utilization and allocation of device resources.

In some embodiments, different application strategies result in different user experiences with respect to the application. In some cases, an associated application user interface may be altered, albeit as seamlessly as possible, as an application strategy being executed with respect to an application is varied. As one example, certain application features may not be available (e.g., may be grayed out or otherwise appear unavailable in a corresponding user interface) for options or actions that are not a part of a current application strategy being executed for an application on a device. With respect to the rewards service application of FIG. 1, for instance, during low power states at a device, certain presence or location detection technologies as well as user actions (e.g., check-in, walk-in, scan, etc.) may not be available with respect to the application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

determining a state of a mobile device;

selecting an application strategy for an application running on the mobile device based on the determined state of the mobile device, wherein the application strategy specifies one or more optional application actions; and executing the selected application strategy for the application while the mobile device remains in the determined state;

wherein different application strategies are selected and executed with respect to the application for different detected states of the mobile device, the application strategies including at least one application strategy that causes at least one action by a user of the mobile device to become unavailable to the user based on a particular state of the mobile device.

2. The method of claim 1, wherein the state of the mobile device is based at least in part on a current power or battery state of the mobile device.

3. The method of claim 1, wherein the state of the mobile device is based at least in part on current operation of one or more sensors on the mobile device.

4. The method of claim 1, wherein the state of the mobile device depends on one or more applications, including the application, running on the mobile device.

5. The method of claim 1, wherein the state of the mobile device depends on one or more user activities or interactions with respect to the mobile device or applications running on the mobile device.

6. The method of claim 1, wherein a power cost on the mobile device for executing the application strategy with respect to the application depends on power costs of the one or more optional application actions comprising the application strategy.

7. The method of claim 1, wherein the application strategy specifies frequencies for executing the one or more optional application actions.

8. The method of claim 1, wherein the application strategy specifies a hierarchy, order, or both for executing the one or more optional application actions.

9. The method of claim 1, wherein the application strategy is associated with presence or location detection of the mobile device.

10. The method of claim 1, wherein the one or more optional application actions comprise presence or location detection using GPS (Global Positioning System).

11. The method of claim 1, wherein the one or more optional application actions comprise presence or location detection using cellular communications.

12. The method of claim 1, wherein the one or more optional application actions comprise presence or location detection using WIFI communications.

13. The method of claim 1, wherein the one or more optional application actions comprise presence or location detection using a sound signal transmitted by a sound transmitter.

14. The method of claim 1, wherein the one or more optional application actions comprise presence or location detection using BLUETOOTH or BLUETOOTH Low Energy communications.

15. The method of claim 1, wherein the one or more optional application actions comprise presence or location detection using one or more of: an accelerometer, a gyroscope, and a magnetometer.

16. The method of claim 1, wherein different application strategies are defined for different types of devices and states thereof.

17. The method of claim 1, further comprising disabling options or features in a user interface of the application that correspond to application actions not included in the application strategy.

18. The method of claim 1, wherein the state comprises a first state and the application strategy comprises a first application strategy and further comprising determining that the mobile device is in a second state and selecting and executing a second application strategy with respect to the application instead of the first application strategy, wherein the second application strategy is different than the first application strategy.

19. A system, comprising:

a processor configured to:

determine a state of a mobile device;

select an application strategy for an application running on the mobile device based on the determined state of the mobile device, wherein the application strategy specifies one or more optional application actions; and execute the selected application strategy for the application while the mobile device remains in the determined state;

wherein different application strategies are selected and executed with respect to the application for different detected states of the mobile device, the application strategies including at least one application strategy that causes at least one action by a user of the mobile device to become unavailable to the user based on a particular state of the mobile device; and a memory coupled to the processor and configured to provide the processor with instructions.

20. A computer program product embodied in a non-transitory computer readable storage medium and comprising computer instructions for:

determining a state of a mobile device;

selecting an application strategy for an application running on the mobile device based on the determined state of the mobile device, wherein the application strategy specifies one or more optional application actions; and executing the selected application strategy for the application while the mobile device remains in the determined state;

wherein different application strategies are selected and executed with respect to the application for different detected states of the mobile device, the application strategies including at least one application strategy that causes at least one action by a user of the mobile device to become unavailable to the user based on a particular state of the mobile device.

* * * * *